(12) United States Patent
Mitsuhashi et al.

(10) Patent No.: US 8,514,418 B2
(45) Date of Patent: Aug. 20, 2013

(54) LINE WIDTH MEASURING DEVICE, LINE WIDTH MEASURING METHOD, IMAGE PROCESSING APPARATUS, IMAGE PROCESSING SYSTEM, AND COMPUTER READABLE MEDIUM

(75) Inventors: Tomoyuki Mitsuhashi, Kanagawa (JP); Yuichi Nishikuni, Kanagawa (JP); Fumihiko Ogasawara, Kanagawa (JP); Toshio Koriyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 127 days.

(21) Appl. No.: 13/248,628

(22) Filed: Sep. 29, 2011

(65) Prior Publication Data
US 2012/0250054 A1  Oct. 4, 2012

(30) Foreign Application Priority Data

Mar. 28, 2011 (JP) .................................. 2011-071006

(51) Int. Cl.
*G06K 15/02* (2006.01)

(52) U.S. Cl.
USPC .......................... 358/1.13; 358/1.15; 382/201

(58) Field of Classification Search
USPC ................. 358/1.13, 1.15; 382/201
See application file for complete search history.

(56) References Cited

U.S. PATENT DOCUMENTS

2002/0141647 A1 * 10/2002 Mitsui ........................... 382/201
2004/0213435 A1 * 10/2004 Hatakeyama ................. 382/112

FOREIGN PATENT DOCUMENTS

| JP | A-10-283483 | 10/1998 |
| JP | A-2002-8046 | 1/2002 |

* cited by examiner

*Primary Examiner* — Qian Yang
(74) *Attorney, Agent, or Firm* — Oliff & Berridge, PLC

(57) ABSTRACT

A line width measuring device includes an acquisition unit, an extraction unit, and a generation unit. The acquisition unit that acquires a binary image that is obtained by reading a medium having a line width sample printed thereon with an image reading device, the line width sample representing output characteristics regarding a line width of an image forming device. The extraction unit that extracts a displacement amount of steps that are repeatedly generated in an image corresponding to the line width sample in the binary image by reading the medium with the image reading device in an orientation such that the line width sample has an angle $\theta$ ($0°<\theta<90°$) with respect to a main scanning direction of image reading. The generation unit that generates line width information regarding a width of the line width sample by using the displacement amount extracted by the extraction unit.

11 Claims, 16 Drawing Sheets

FIG. 12

```
Image/
    Color/
        Intent=Perceptual
        Gray=Normal
        RGB=255/0/0,Lab=50/70/60
        RGB=0/0/0,Lab=15/0/0
        CMYK=0/0/255/0,Lab=90/0/100
    /
    Screen/
        Line=200
        Angle=45
        Type=Dot
    /
/
Other/
    Policy/
        OOR=OFF
        OOH=OFF
    /
/
```

FIG. 14

| INDEX | SPECIFYING INFORMATION | RESOLUTION | GRADATION INFORMATION | SCREEN | COLOR TONE | SPECIAL PROCESSING 1 | SPECIAL PROCESSING 2 |
|---|---|---|---|---|---|---|---|
| 1 | NONE | 600×600 | 1 | MEDIUM NUMBER OF LINES | FOR CHARACTER | NONE | NONE |
| 2 | NONE | 600×600 | 8 | SMALL NUMBER OF LINES | FOR PHOTOGRAPH | NONE | GRADATION SMOOTHING |
| 3 | NONE | 1200×1200 | 1 | OBJECT OPTIMIZATION | OBJECT OPTIMIZATION | EDGE ENHANCEMENT | NONE |
| 4 | HIGH QUALITY | | | NOT SPECIFIED | | | |
| 5 | CUSTOM 1 | | | NOT SPECIFIED | | | |

FIG. 15

| RENDERING COMMAND | DETAILS OF RENDERING |
|---|---|
| CHARACTER RENDERING 1 | PROCESS AS OUTLINE DATA |
| CHARACTER RENDERING 2 | PROCESS AS BITMAP DATA |
| GRAPHIC RENDERING 1 | FILL RECTANGULAR REGION |
| GRAPHIC RENDERING 2 | DRAW LINE |
| GRAPHIC RENDERING 3 | GRADATION |
| IMAGE RENDERING 1 | IMAGE DATA |
| IMAGE RENDERING 2 | FILL RECTANGULAR REGION |

LINE WIDTH MEASURING DEVICE, LINE WIDTH MEASURING METHOD, IMAGE PROCESSING APPARATUS, IMAGE PROCESSING SYSTEM, AND COMPUTER READABLE MEDIUM

CROSS-REFERENCE TO RELATED APPLICATIONS

This application is based on and claims priority under 35 USC 119 from Japanese Patent Application No. 2011-071006 filed Mar. 28, 2011.

BACKGROUND

Technical Field

The present invention relates to a line width measuring device, a line width measuring method, an image processing apparatus, an image processing system, and a computer readable medium.

SUMMARY

According to an aspect of the invention, a line width measuring device includes an acquisition unit, an extraction unit, and a generation unit. The acquisition unit that acquires a binary image that is obtained by reading a medium having a line width sample printed thereon with an image reading device, the line width sample representing output characteristics regarding a line width of an image forming device. The extraction unit that extracts a displacement amount of steps that are repeatedly generated in an image corresponding to the line width sample in the binary image by reading the medium with the image reading device in an orientation such that the line width sample has an angle θ (0°<θ<90°) with respect to a main scanning direction of image reading. The generation unit that generates line width information regarding a width of the line width sample by using the displacement amount extracted by the extraction unit.

BRIEF DESCRIPTION OF THE DRAWINGS

An exemplary embodiment of the present invention will be described in detail based on the following figures, wherein:

FIG. 12 illustrates an example of image quality target information generated by the image handling system according to the exemplary embodiment of the present invention;

FIG. 14 illustrates examples of image quality instructions that are transmitted by the image handling system according to the exemplary embodiment of the present invention;

FIG. 15 illustrates examples of rendering commands that are transmitted by the image handling system according to the exemplary embodiment of the present invention;

DETAILED DESCRIPTION

Hereinafter, an exemplary embodiment of the present invention will be described in detail with reference to the drawings.

Figure 1:
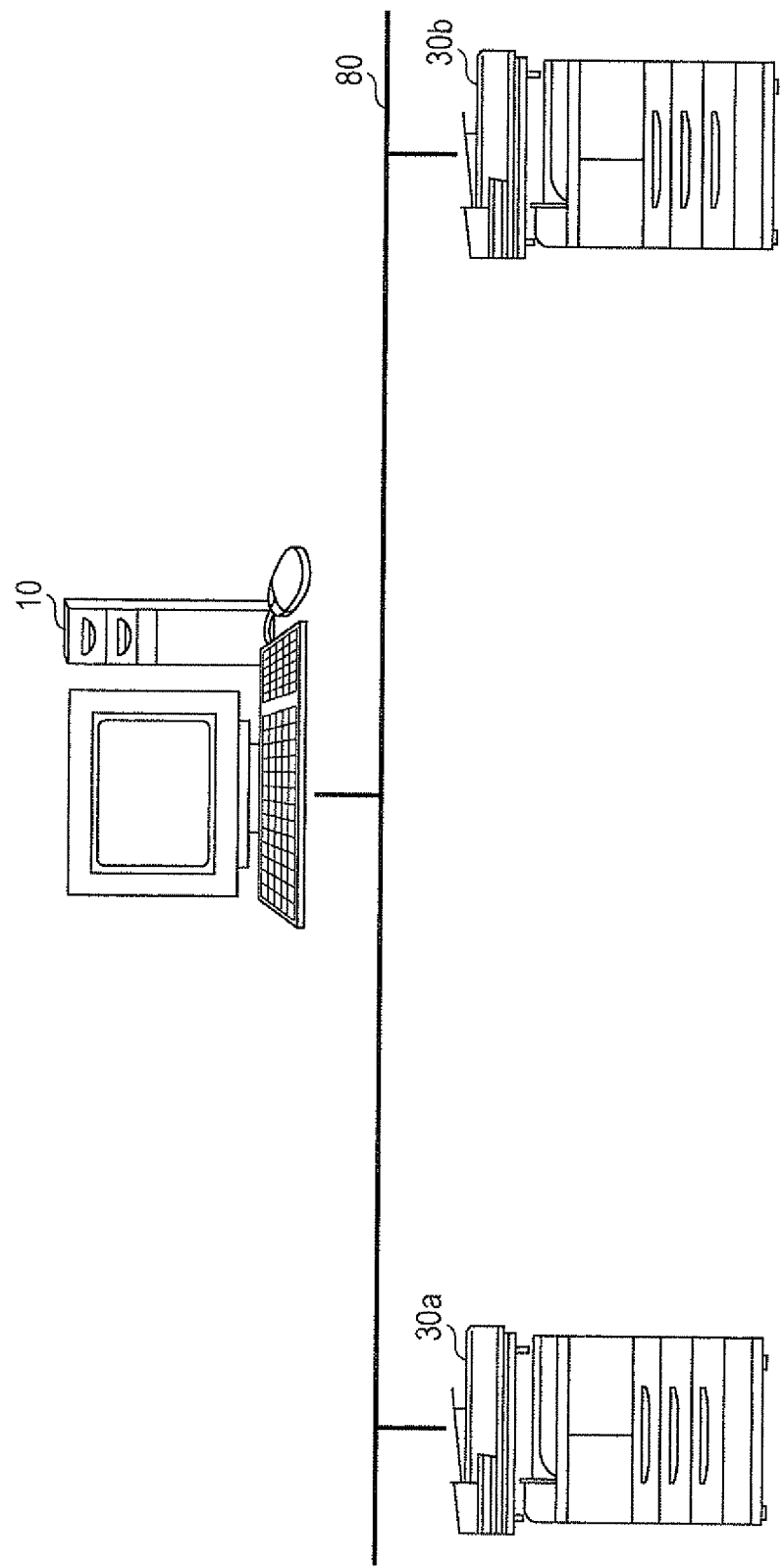
FIG. 1 illustrates the overall structure of an image handling system according to an exemplary embodiment of the present invention.

FIG. 1 illustrates an exemplary structure of an image handling system according to the exemplary embodiment of the present invention.

As illustrated in FIG. 1, the image handling system includes a terminal apparatus 10, a target image processing apparatus (hereinafter referred to as "target apparatus") 30*a*, and a handling image processing apparatus (hereinafter referred to as "handling apparatus") 30*b*, which are connected to one another through a network 80.

The terminal apparatus 10 is a computer that transmits data that instructs the target apparatus 30*a* and the handling apparatus 30*b* to perform printing (hereinafter referred to as "print instruction data"). A personal computer (PC), for example, may be used as the terminal apparatus 10. In this case, the PC may operate as a client PC or as a server PC. In the present exemplary embodiment, the terminal apparatus 10 is provided as an example of an information transmitting device and an information generating device.

The target apparatus 30*a* is an image processing apparatus that has an image reading function of reading an image of a medium such as paper and an image forming function of forming an image on a medium such as paper. The target apparatus 30a serves as a target of other image processing apparatuses with respect to the an image quality characteristics of an output image. Here, the term "image quality characteristics" refers to characteristics of the factors related to the quality of an image (hereinafter referred to as "image quality factors"). For example, if color is considered as the image quality factor, the image quality characteristics are a value, in a Lab color space, of a color reproduced on the basis of a CMYK signal and the like. If line is considered as the image quality factor, the image quality characteristics are a value (µm) of a line width reproduced on the basis of a point value and the like.

The handling apparatus 30b is an image processing apparatus that has an image reading function of reading an image of a medium such as paper and an image forming function of forming an image on a medium such as paper. The handling apparatus 30b is an apparatus that is controlled so that the image quality characteristics of an output image thereof become closer to the image quality characteristics of the target apparatus 30a.

The network 80 is a communication network through which the terminal apparatus 10, the target apparatus 30a, and the handling apparatus 30b perform communication. A local area network (LAN) or the Internet may be used as the network 80.

Next, the functional structures of the apparatuses of the image handling system of FIG. 1 will be described.

Figure 2:
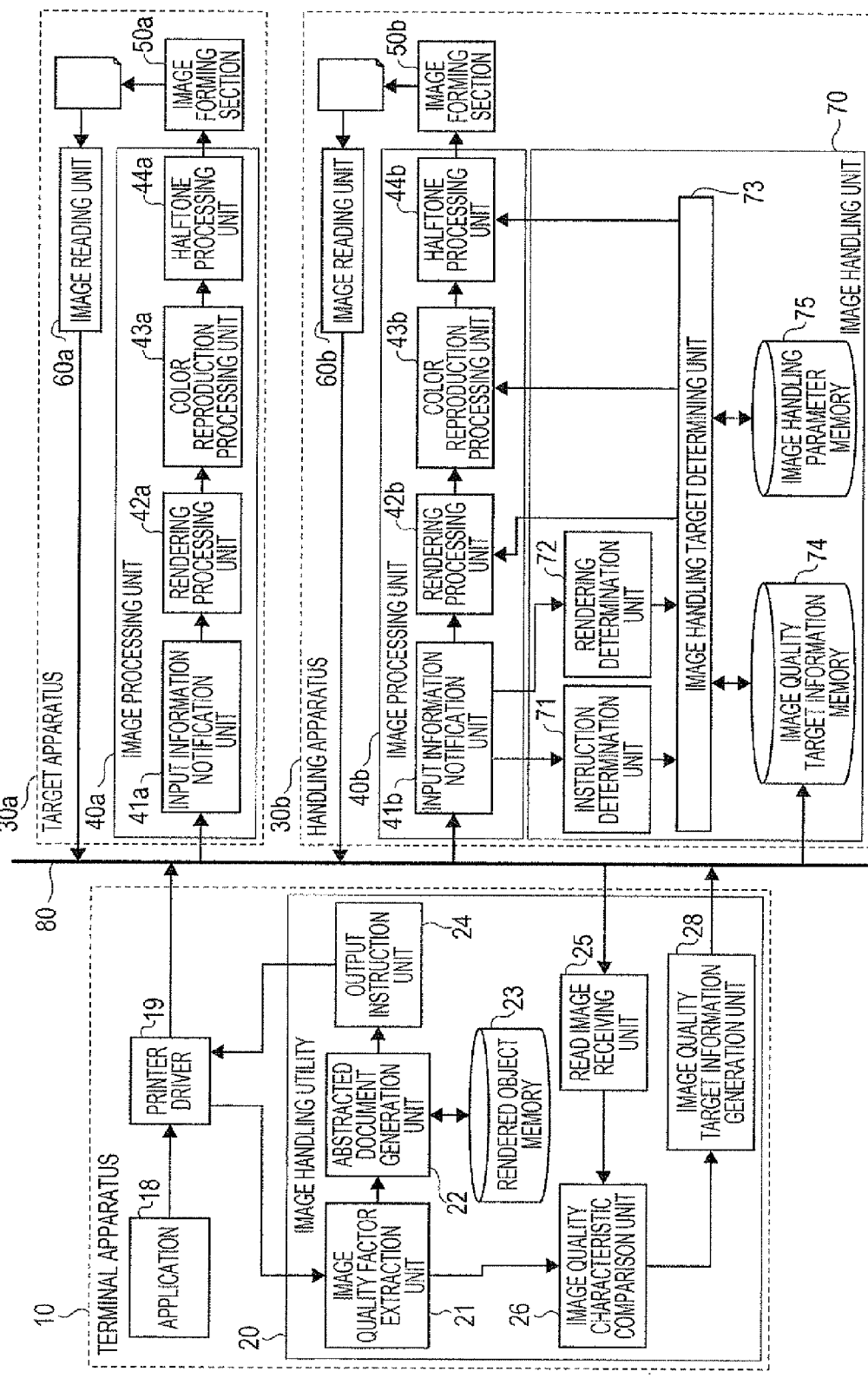
FIG. 2 illustrates exemplary functional structures of apparatuses of the image handling system according to the exemplary embodiment of the present invention.

FIG. 2 is a block diagram illustrating exemplary functional structures of the apparatuses of the image handling system.

First, the functional structure of the terminal apparatus 10 will be described.

As illustrated in FIG. 2, an application program (hereinafter referred to as "application") 18, a printer driver 19, and an image handling utility 20 operate in the terminal apparatus 10.

The application 18 is a program that generates document data and stores the generated document data in response to operations by a user. The application 18 also generates and stores test chart data, which is electronic data of a test chart, in response to an operation by a user.

The printer driver 19 is a program that transmits print instruction data that instructs the target apparatus 30a and the handling apparatus 30b to print a document when a request for printing based on document data is received from the application 18. The printer driver 19 also transmits print instruction data that instructs the target apparatus 30a and the handling apparatus 30b to print a test chart when a request for printing based on test chart data is received from the application 18. The print instruction data is, for example, PDL data described in a page description language (PDL). The print instruction data includes an image quality instruction regarding image quality, such as resolution, gradation information, and screen; and a rendering command for rendering characters, graphics, and images. In the present exemplary embodiment, the print instruction data is used as an example of print instruction information.

The image handling utility 20 is a utility program that generates information that is used to make the image quality characteristics of an image output by the handling apparatus 30b be closer to the image quality characteristics of an image output by the target apparatus 30a (hereinafter this processing will be referred to as "target matching"). In the present exemplary embodiment, the image handling utility 20 is implemented in the terminal apparatus 10. However, for example, the image handling utility 20 may be implemented in the handling apparatus 30b or in an independent device. In the present exemplary embodiment, the image quality characteristics of the target apparatus 30a are used as a reference, and the image quality characteristics of the handling apparatus 30b are made closer to the reference. Alternatively, image quality characteristics that are in the middle of the image quality characteristics of the target apparatus 30a and the image quality characteristics of the handling apparatus 30b may be used as a reference, and the image quality characteristics of the handling apparatus 30b may be made closer to the reference.

The terminal apparatus 10 includes, as functions of the image handling utility 20, an image quality factor extraction unit 21, an abstracted document generation unit 22, a rendering object memory 23, an output instruction unit 24, a read image receiving unit 25, an image quality characteristic comparison unit 26, and an image quality target information generation unit 28.

The image quality factor extraction unit 21 receives print instruction data that instructs printing of a document from the printer driver 19, and extracts image quality factors from the print instruction data.

The abstracted document generation unit 22 generates document data that is abstracted on the basis of the image quality factors extracted by the image quality factor extraction unit 21 (hereinafter referred to as "abstracted document data"). To be specific, the abstracted document generation unit 22 generates abstracted document data that is focused on the image quality factors extracted by the image quality factor extraction unit 21 so that target matching regarding the image quality factors may be readily performed.

The rendering object memory 23 is a database that stores rendering objects that are necessary to generate the abstracted document data in the form of rendering commands.

The output instruction unit 24 sends the abstracted document data to the printer driver 19 and thereby gives an instruction to the printer driver 19 to output print instruction data that instructs printing of the abstracted document.

The read image receiving unit 25 receives read images through the network 80. The read images are, as will be described below, obtained by reading an abstracted document or a test chart that has been output on the basis of the print instruction data sent from the printer driver 19 by using an image reading unit 60a of the target apparatus 30a and an image reading unit 60b of the handling apparatus 30b.

The image quality characteristic comparison unit 26 compares the read image that the read image receiving unit 25 has received from the target apparatus 30a with the read image that the read image receiving unit 25 has received from the handling apparatus 30b for each of the image quality factors extracted by the image quality factor extraction unit 21.

On the basis of a comparison result obtained by the image quality characteristic comparison unit 26, the image quality target information generation unit 28 generates information (hereinafter referred to as "image quality target information") for making the image quality characteristics of an image output by the handling apparatus 30b be closer to the image quality characteristics of an image output by the target apparatus 30a. In the present exemplary embodiment, the image quality target information is used as an example of correction information. The image quality target information generation unit 28 is provided as an example of a correction information generation unit that generates the correction information.

Next, the functional structure of the target apparatus 30a will be described.

As illustrated in FIG. 2, the target apparatus 30a includes an image processing unit 40a, an image forming section 50a, and the image reading unit 60a.

The image processing unit 40a performs image processing on the basis of print instruction data transmitted from the printer driver 19 through the network 80, and outputs image data.

The image forming section 50a forms an image on a medium such as paper on the basis of the image data output by the image processing unit 40a and thereby outputs a document (including an abstracted document) or a test chart. In the present exemplary embodiment, the image forming section 50a is provided as an example of an image forming device, a printing unit, and a first printer.

The image reading unit 60a reads the abstracted document or the test chart, which has been output by the image forming section 50a, and transmits the read image to the read image receiving unit 25 through the network 80. The image reading unit 60a may be an in-line scanner that automatically reads the abstracted document or the test chart, which has been output by the image forming section 50a. Alternatively, the image reading unit 60a may be a scanner that is independent from the image forming section 50a. In the present exemplary embodiment, adjustment between two image processing apparatuses 30 (30a and 30b) is described. If, for example, there are three image processing apparatuses 30, outputs of the image forming sections 50 of two of the image processing apparatuses 30 may be read by using a single scanner. In the present exemplary embodiment, the image reading unit 60a is provided as an example of an image reading device, a reading unit, and a first reading device.

Here, the image processing unit 40a will be described further in detail. The image processing unit 40a includes an input information notification unit 41a, a rendering processing unit 42a, a color reproduction processing unit 43a, and a halftone processing unit 44a.

The input information notification unit 41a notifies the rendering processing unit 42a of print instruction data, which has been input from the printer driver 19 through the network 80.

The rendering processing unit 42a renders image data on the basis of a rendering command included in the print instruction data notified by the input information notification unit 41a.

The color reproduction processing unit 43a performs various types of color reproduction processing on the image data rendered by the rendering processing unit 42a. Examples of the types of color reproduction processing include processing for converting a color signal of a rendering command in a specific color space to a color signal in a different color space, processing for converting a color signal to a different color signal within a color reproduction range, and processing for correcting gradation of a color signal.

The halftone processing unit 44a generates a pseudo-halftone image by performing screening or the like.

Next, the functional structure of the handling apparatus 30b will be described.

As illustrated in FIG. 2, the handling apparatus 30b includes an image processing unit 40b, an image forming section 50b, the image reading unit 60b, and an image handling unit 70.

The image processing unit 40b performs image processing on the basis of print instruction data transmitted from the printer driver 19 through the network 80, and outputs image data.

The image forming section 50b forms an image on a medium such as paper on the basis of the image data output by the image processing unit 40b and thereby outputs a document (including an abstracted document) or a test chart. In the present exemplary embodiment, the image forming section 50b is provided as an example of an image forming device, a printing unit, and a second printer.

The image reading unit 60b reads the abstracted document or the test chart, which has been output by the image forming section 50b, and transmits the read image to the read image receiving unit 25 through the network 80. The image reading unit 60b may be an in-line scanner that automatically reads the abstracted document or the test chart, which has been output by the image forming section 50b. Alternatively, the image reading unit 60b may be a scanner that is independent from the image forming section 50b. In the present exemplary embodiment, adjustment between two image processing apparatuses 30 is described. If, for example, there are three image processing apparatuses 30, outputs of the image forming sections 50 of two of the image processing apparatuses 30 may be read by using a single scanner. In the present exemplary embodiment, the image reading unit 60b is provided as an example of an image reading device, a reading unit, and a second reading device.

The image handling unit 70 performs processing (hereinafter referred to as "image handling") for outputting an image having an image quality characteristics close to those of an image output by the target apparatus 30a.

Here, the image processing unit 40b will be described further in detail. The image processing unit 40b includes an input information notification unit 41b, a rendering processing unit 42b, a color reproduction processing unit 43b, and a halftone processing unit 44b.

The input information notification unit 41b notifies the image handling unit 70 and the rendering processing unit 42b of print instruction data, which has been input from the printer driver 19 through the network 80.

The rendering processing unit 42b renders image data on the basis of a rendering command included in the print instruction data notified by the input information notification unit 41b. At this time, rendering processing is performed on the basis of determination made by the image handling unit 70.

The color reproduction processing unit 43b performs various types of color reproduction processing on the image data rendered by the rendering processing unit 42b. Examples of the types of color reproduction processing include processing for converting a color signal of a rendering command in a specific color space to a color signal in a different color space, processing for converting a color signal to a different color signal within a color reproduction range, and processing for correcting gradation of a color signal. At this time, color reproduction processing is performed on the basis of determination made by the image handling unit 70.

The halftone processing unit 44b generates a pseudo-halftone image by performing screening or the like. At this time, halftone processing is performed on the basis of the determination made by the image handling unit 70.

The image handling unit 70 will be described further in detail. The image handling unit 70 includes an instruction determination unit 71, a rendering determination unit 72, an image handling target determining unit 73, an image quality target information memory 74, and an image handling parameter memory 75.

The instruction determination unit 71 determines the contents of the image quality instruction included in print instruction data notified by the input information notification unit 41b.

The rendering determination unit 72 determines the contents of the rendering command included in print instruction data notified by the input information notification unit 41b.

The image handling target determining unit 73 determines image quality characteristics that serve as a target of image handling on the basis of the image quality instruction, whose contents have been determined by the instruction determination unit 71, and on the basis of image quality target information stored in the image quality target information memory 74.

The image quality target information memory 74 stores the image quality target information, which is generated by the image quality target information generation unit 28 of the image handling utility 20.

The image handling parameter memory 75 stores image handling parameters that are used to perform image handling for outputting an image having the image quality characteristics determined by the image handling target determining unit 73.

Next, operations of an image handling system according to the present exemplary embodiment will be described.

First, a target matching operation of the image handling system will be described. In the image handling system, print instruction data that instructs printing of a document or print instruction data that instructs printing of a test chart is transmitted. When print instruction data that instructs printing of a document is transmitted, the abstracted document generation unit 22 generates abstracted document data, and the output instruction unit 24 issues an instruction for outputting print instruction data that instructs printing of an abstracted document. However, description of this processing will be omitted because it is not directly related to the present invention. A target matching operation that is performed when print instruction data that instructs printing of a test chart is transmitted will be described.

Figure 3:
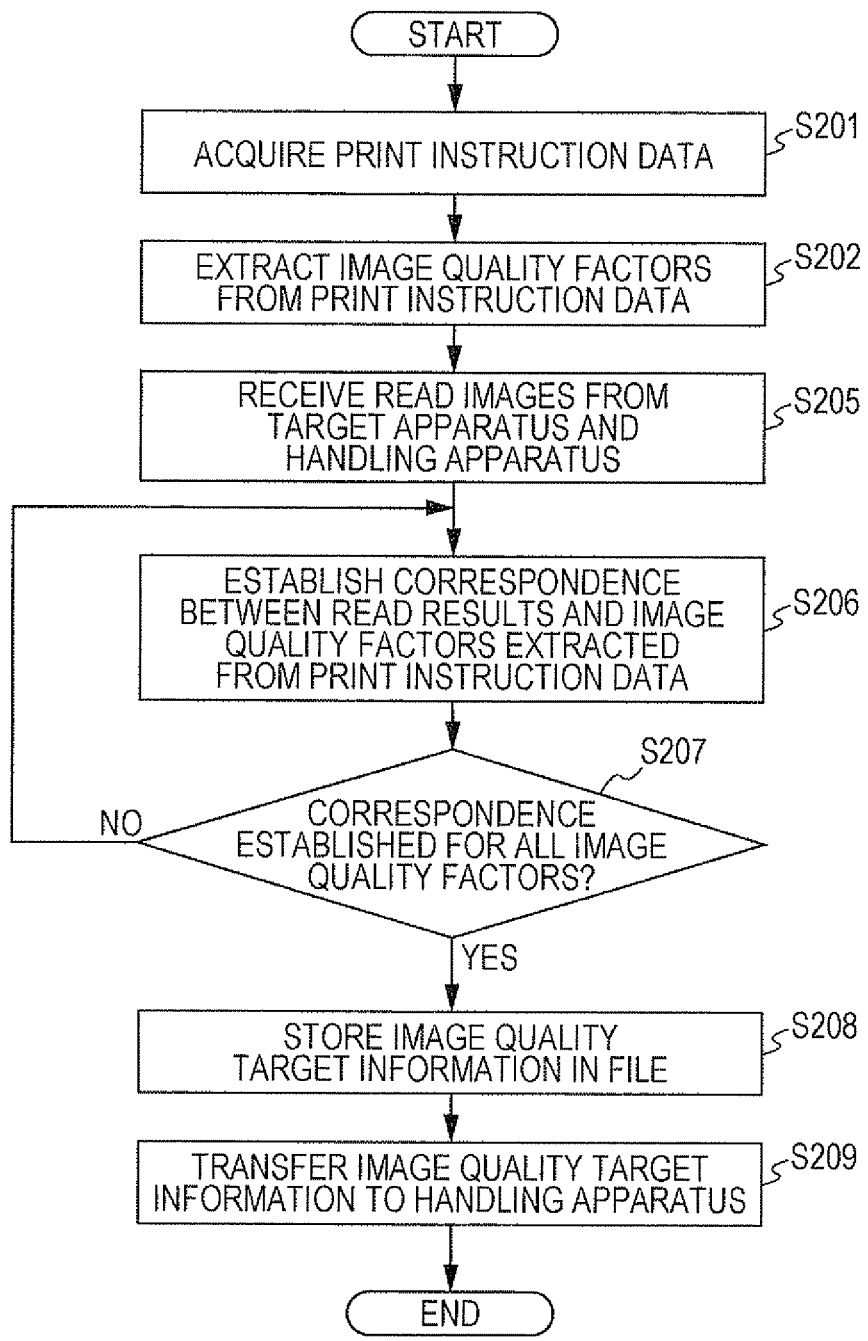
FIG. 3 is a flowchart illustrating an exemplary operation of an image handling utility of the image handling system according to the exemplary embodiment of the present invention.

FIG. 3 is a flowchart illustrating an exemplary operation of the image handling utility 20 performed at this time.

By using the application 18, a user specifies test chart data, the target apparatus 30a that serves as a target to which image quality characteristics are to be matched, an the handling apparatus 30b whose image quality characteristics are to be matched to those of the target. When the printer driver 19 generates print instruction data that instructs printing based on test chart data, the operation of the image handling utility 20 is started.

In the image handling utility 20, first, the image quality factor extraction unit 21 acquires print instruction data that instructs printing based on the specified test chart data from the printer driver 19 (step 201). Then, the image quality factor extraction unit 21 extracts image quality factors from the print instruction data (step 202). To be specific, image quality factors, such as character, image, and graphic are extracted from the rendering commands of the print instruction data. For example, if the test chart is a test chart for line width measurement, a command of drawing a line as a graphic and a point value of the line are extracted.

The printer driver 19 outputs print instruction data that instructs the target apparatus 30a and the handling apparatus 30b to perform printing based on the test chart data. The target apparatus 30a outputs a test chart by using the image forming section 50a, and the handling apparatus 30b outputs a test chart by using the image forming section 50b.

Subsequently, the test chart output by the image forming section 50a is read by the image reading unit 60a, and the test chart output by the image forming section 50b is read by the image reading unit 60b. The read images are sent to the image handling utility 20 through the network 80.

Then, in the image handling utility 20, the read image receiving unit 25 first receives the read images (step 205).

Next, the image quality characteristic comparison unit 26 receives the read images from the read image receiving unit 25, and the image quality characteristics of the target apparatus 30a and the image quality characteristics of the handling apparatus 30b are compared with each other on the basis of the read images. To be specific, with respect to the image quality factors extracted by the image quality factor extraction unit 21, the image quality characteristic comparison unit 26 establishes a correspondence between the image quality characteristics obtained from the read image that is read by the target apparatus 30a and received by the read image receiving unit 25 and the image quality characteristics obtained from the read image that is read by the handling apparatus 30b and received by the read image receiving unit 25 (step 206).

The image quality characteristic comparison unit 26 determines whether or not the correspondence has been established for all image quality factors (step 207).

If it is determined that the correspondence has not been established for all image quality factors, the process returns to step 206, and the image quality characteristic comparison unit 26 repeats, for the number of image quality factors, the operation of establishing the correspondence between the image quality characteristics obtained from the read image read by the target apparatus 30a and the image quality characteristics obtained from the read image read by the handling apparatus 30b.

If it is determined that the correspondence has been established for all image quality factors, the image quality characteristic comparison unit 26 sends the correspondence result to the image quality target information generation unit 28. The image quality target information generation unit 28 generates image quality target information and stores the image quality target information in a file (step 208). Then, the image quality target information is transmitted to the image handling unit 70 of the handling apparatus 30b through the network 80 (step 209). Thus, in the image handling unit 70, the image quality target information is stored in the image quality target information memory 74.

The operation performed in step 205 of FIG. 3 will be described in detail.

In this step, images read by the image reading units 60a and 60b are received. Moreover, in the present exemplary embodiment, the widths of lines output by the image forming sections 50a and 50b are measured in this step. That is, the image forming sections 50a and 50b each output a test chart for line width measurement (hereinafter referred to as "line width measurement chart"), on which lines having different widths are drawn, and the image reading units 60a and 60b each read the line width measurement chart. The line widths are measured on the basis of the read image of each of the line width measurement charts. In this case, the data size of the read image becomes large if the line width measurement chart is read with high resolution, although it is ideal. The data size of an image may be small with consideration of the time required for image processing and the load of data transfer.

Therefore, the image reading units 60a and 60b read the line width measurement charts and covert the read images to monochrome images represented by binary values (hereinafter referred to as "monochrome binary images"), and the read image receiving unit 25 measures the line widths by using the monochrome binary images.

Figure 4:
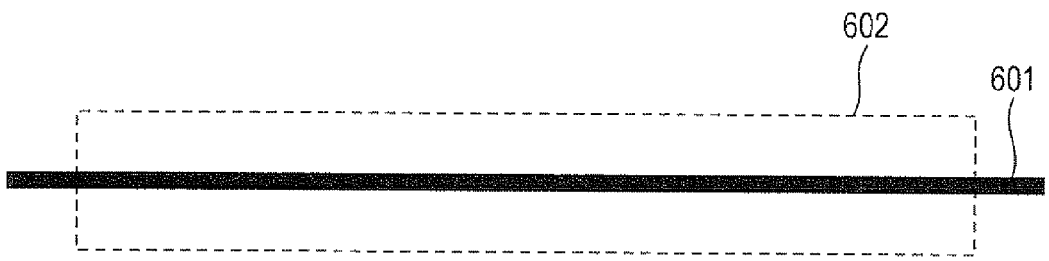
FIG. 4 is a diagram for illustrating a line width measuring method used in the exemplary embodiment of the present invention.

FIG. 4 illustrates a line width measuring method for measuring a line width on the basis of such a monochrome binary image.

With the line width measuring method, a line width is measured through the following steps.

In the first step, a region (hereinafter referred to as "line width measurement region") 602 including a part of the line to be measured 601 that is used for line width measurement is determined.

In the second step, the number $N_A$ of black pixels in the line width measurement region 602 of the line to be measured 601, which is determined in the first step, is counted.

In the third step, the number $N_A$ of black pixels counted in the second step is divided by the number $N_L$ of black pixels corresponding to the length of the line width measurement region 602, which is determined in the first step, in the line drawing direction.

In the fourth step, the value obtained in the third step is multiplied by the diameter R (μm) of a pixel.

Through these steps, a line width W (μm) is calculated as $W=(N_A/N_L) \times R$.

In the present exemplary embodiment, it is not necessary to calculate the exact value of the line width, because it is sufficient that the line width of an image output by the target apparatus 30a and the line width of an image output by the handling apparatus 30b be compared with each other. Therefore, the fourth step may be omitted.

Next, a monochrome binary image that is obtained when the line width measurement chart is read in an orientation such that the lines extend substantially parallel to the main scanning direction and a monochrome binary image that is obtained when the line width measurement chart is read in an orientation such that the lines have an angle that is specified with respect to the main scanning direction (hereinafter referred to as "specified angle") are compared with each other.

Figure 5A:
FIG. 5A illustrates a monochrome binary image of a line when the line is read in a main scanning direction.
Figure 5B:
FIG. 5B illustrates a monochrome binary image of the line when the line is read at an angle with respect the main scanning direction.

FIGS. 5A and 5B illustrate these monochrome binary images.

FIG. 5A illustrates an example of a monochrome binary image of a line when a line width measurement chart is read in an orientation such that the lines extend substantially parallel to the main scanning direction. In this case, because it is difficult to make the line perfectly parallel to the main scanning direction, upper pixels may or may not be included in the image of the line depending on the position of the line in the main scanning direction. Therefore, parts having a larger line width and parts having a smaller line width are randomly generated in the image of the line.

FIG. 5B illustrates an example of a monochrome binary image of a line when the line width measurement chart is read in an orientation such that the lines have a specified angle with respect to the main scanning direction. In this case, because the pixels of the line shift to upper positions at a certain period, parts having a larger line width are regularly generated at the certain period.

Next, the results of line width measurement obtained on the basis of these monochrome binary images are compared with each other by using graphs.

Figure 6A:
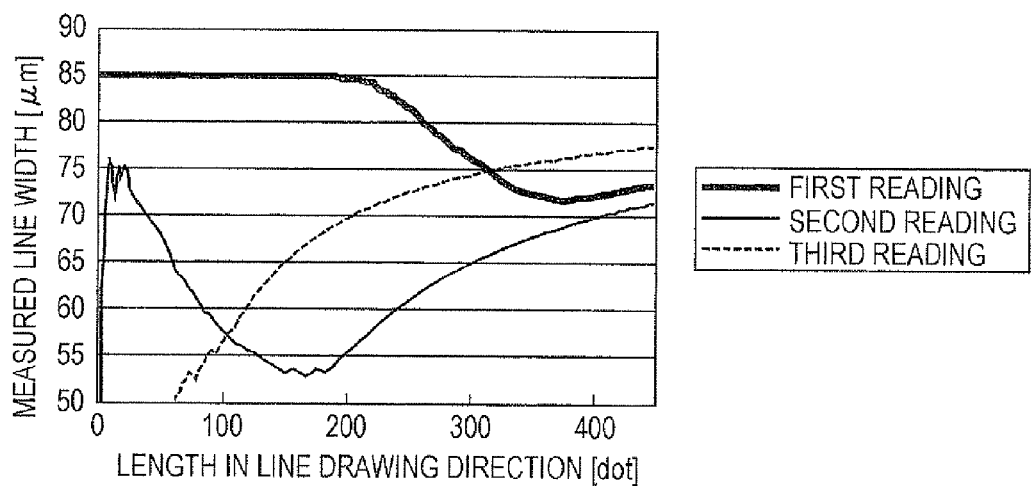
FIG. 6A illustrates a result of line width measurement when the line is read in the main scanning direction.
Figure 6B:
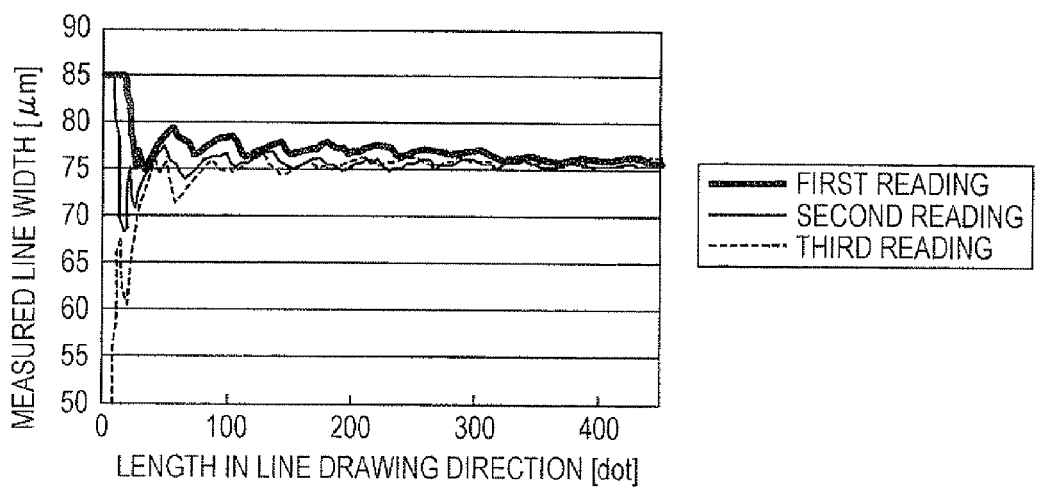
FIG. 6B illustrates a result of line width measurement when the line is read at an angle with respect the main scanning direction.

FIGS. 6A and 6B are graphs illustrating the results of line width measurement. In each graph, the horizontal axis represents the length of the line width measurement region 602 in the line drawing direction (length in the drawing direction), and the vertical axis represents the line width that is measured when the line width measurement region 602 having the length in the drawing direction is used (measured line width). That is, the graphs each illustrate the result of line width measurement that is performed while increasing the length of the line width measurement region in the line drawing direction. In the present specification, the line drawing direction is either the main scanning direction or the sub-scanning direction. To be specific, the line drawing direction is the main scanning direction if the angle between the line and the main scanning direction is larger than 0° and smaller than 45°. The line drawing direction is the sub-scanning direction if the angle between the line and the main scanning direction is larger than 45° and smaller than 90°. The line drawing direction may be the main scanning direction or the sub-scanning direction if the angle between the line and the main scanning direction is 45°.

Graphs of FIGS. 6A and 6B each illustrate three line width measurement results obtained by reading the same line three times. A thick solid line represents a measurement result obtained by the first reading, a thin solid line represent's a measurement result obtained by the second reading, and a broken line represents a measurement result obtained by the third reading.

FIG. 6A illustrates examples of line width measurement results obtained when the line width measurement chart is read in an orientation such that the lines extend substantially parallel to the main scanning direction. In this case, the line width measurement results considerably differ from each other depending on the length of the line width measurement region in the line drawing direction. This is because parts having a larger line width are randomly generated as illustrated in FIG. 5A.

FIG. 6B illustrates examples of line width measurement results obtained when the line width measurement chart is read in an orientation such that the lines have a specified angle with respect to the main scanning direction. In this case, the longer the line width measurement region in the line drawing direction, the more stable the line width measurement result, and the measured line width converges to a certain line width. The reason for this is as follows. If the line width measurement region is short in the line drawing direction, the influence of parts having a larger line width on the line width measurement result may become large depending on the positions of such parts, because the parts having a larger line width are generated at a constant period as illustrated in FIG. 5B. In contrast, if the line width measurement region is long in the line drawing direction, the influence of the parts having a larger line width is decreased because the parts having a larger line width and parts having a smaller line width are averaged out irrespective of the positions of such parts.

Therefore, in the present exemplary embodiment, the accuracy of line width measurement is increased by using a design or mechanism for reading the line width measurement chart in an orientation such that the lines have a specified angle with respect to the main scanning direction.

Figure 7A:
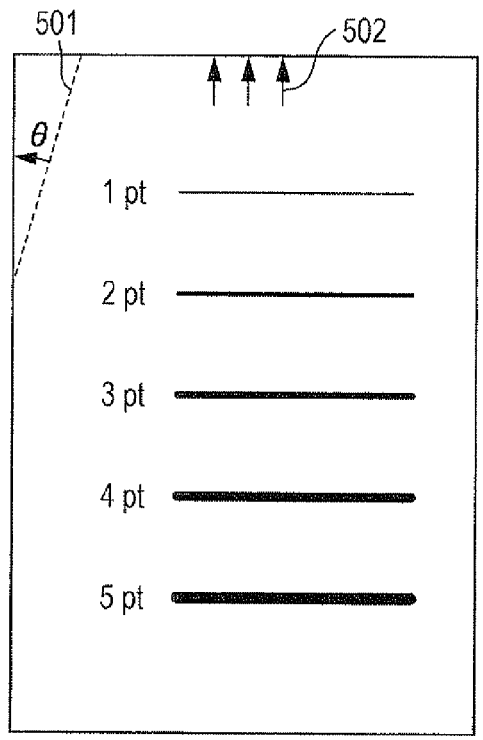
FIGS. 7A to 7C illustrate an example of a line width measurement chart that is designed so that the chart may be read at a specified angle.
Figure 7B:
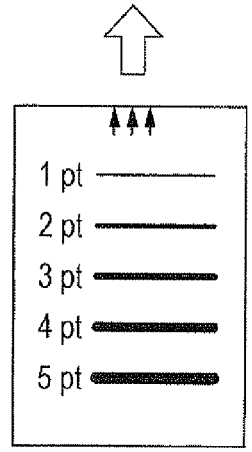
Figure 7C:
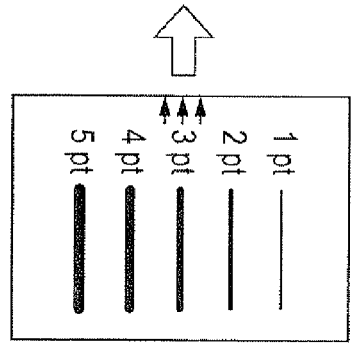

FIGS. 7A to 7C illustrate an example of such design or mechanism.

FIG. 7A is an example of a line width measurement chart on which a folding line 501 having an angle θ with respect to a side thereof is printed so that the lines are read in a direction having the angle θ with respect to the main scanning direction. That is, the lines are read in a direction having the angle θ with respect to the main scanning direction by folding the line width measurement chart along the folding line 501, by turning the line width measurement chart upside down, and by aligning the folded line with the right side of a platen glass of the image reading unit 60.

A mark 502 that represents at least one of the main scanning direction and the sub-scanning direction may also be printed on the line width measurement chart. The main scanning direction is perpendicular the direction of arrows of the mark 502, and the sub-scanning direction is the direction of the arrows of the mark 502. For example, suppose that line width measurement charts of the same type are output in an orientation indicated by empty arrow in FIG. 7B and in an orientation indicated by empty arrow in FIG. 7C. In this case, the line width measurement chart output in the orientation illustrated in FIG. 7B is used to obtain the characteristics of the image forming section 50 in the main scanning direction, and the line width measurement chart output in the orientation illustrated in FIG. 7C is used to obtain the characteristics of the image forming section 50 in the sub-scanning direction. If these charts are superposed on top of each other in the same orientation, the charts are indistinguishable from each other. Therefore, in FIGS. 7A to 7C, the mark 502 is printed so that these charts may be distinguished from each other and read by the image reading unit 60.

Figure 8:
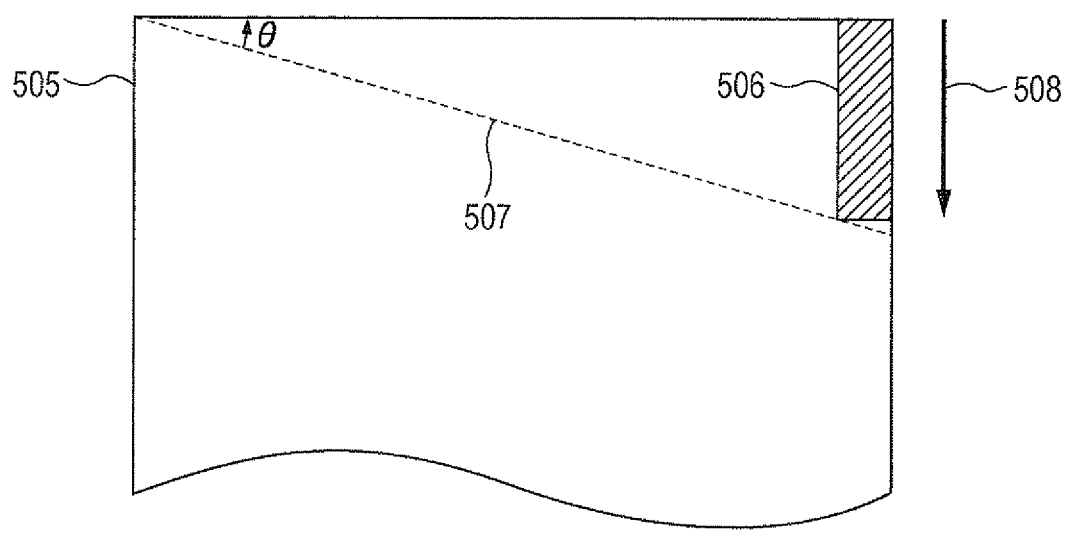
FIG. 8 illustrates an example of an image reading unit that is designed so that the line width measurement chart may be read at a specified angle.

FIG. 8 illustrates another example of a design or mechanism mentioned above.

In this example, a guide 506, which is an example of a restraining member, having a length in accordance with the angle θ is disposed on a platen glass 505 so that the lines are read in an orientation having the angle θ with respect to the main scanning direction. That is, when the line width measurement chart is turned upside down and placed on the platen glass 505, the upper side of the line width measurement chart overlaps the broken line 507, and the lines are read in an orientation having the angle θ with respect to the main scanning direction. The length of the guide 506 may be changed to a value corresponding to any magnitude of the angle θ by pulling the guide 506 from the guide containing portion (not shown) in the direction of arrow 508, and the length of the guide 506 may be temporarily fixed at the value.

Next, the read image receiving unit 25 will be described. The read image receiving unit 25 is an example of a line width measuring device that measures a line width on the basis of a monochrome binary image obtained by reading a line width measurement chart in an orientation such that the lines have an angle θ with respect to the main scanning direction.

Figure 9:
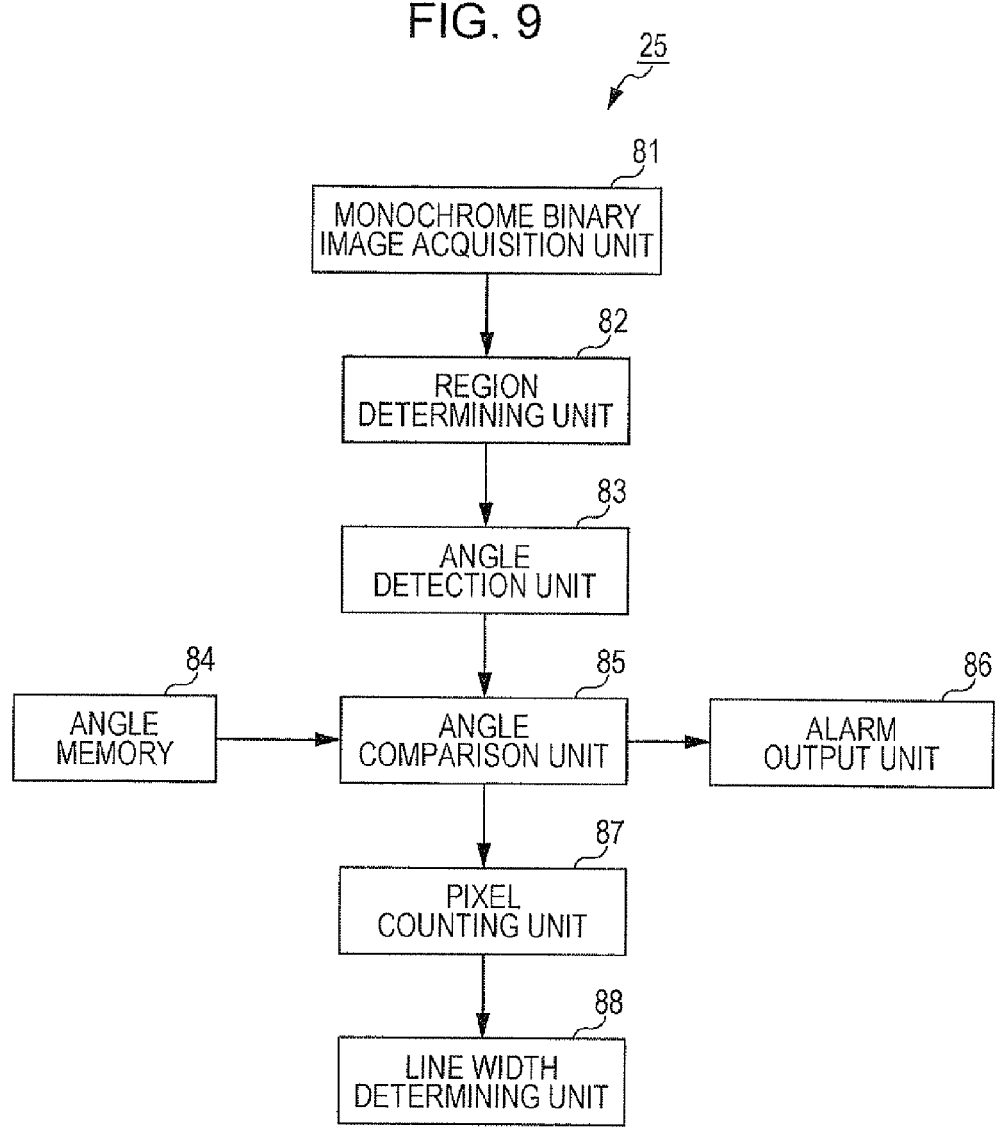
FIG. 9 illustrates an exemplary functional structure of a read image receiving unit of the image handling system according to the exemplary embodiment of the present invention.

FIG. 9 is a block diagram illustrating an exemplary functional structure of the read image receiving unit 25.

As illustrated in FIG. 9, the read image receiving unit 25 includes a monochrome binary image acquisition unit 81, a region determining unit 82, an angle detection unit 83, an angle memory 84, an angle comparison unit 85, an alarm output unit 86, a pixel counting unit 87, and a line width determining unit 88.

The monochrome binary image acquisition unit 81 acquires, from the image reading unit 60a, a monochrome binary image that the image reading unit 60a has obtained by reading a line width measurement chart. The monochrome binary image acquisition unit 81 also obtains from the image reading unit 60b a monochrome binary image that the image reading unit 60b has obtained by reading a line width measurement chart. In the present exemplary embodiment, the line width measurement chart is used as an example of a medium having a line width sample printed thereon. The monochrome binary image is used as an example of a binary image, and the monochrome binary image acquisition unit 81 is provided as an example of an acquisition unit that acquires the binary image.

The region determining unit 82 determines a line width measurement region of the monochrome binary image acquired by the monochrome binary image acquisition unit 81. At this time, a period of steps of the monochrome binary image of a line is obtained and is used as a unit for measuring the length of the line width measurement region in the line drawing direction. In the present exemplary embodiment, the region determining unit 82 is provided as an example of an extraction unit that extracts a period.

The angle detection unit 83 detects the angle between the line in the monochrome binary image and the main scanning direction (hereinafter referred to as "reading angle") on the basis of the monochrome binary image acquired by the monochrome binary image acquisition unit 81 and the line width measurement region determined by the region determining unit 82. In the present exemplary embodiment, the angle detection unit 83 is provided as an example of a detection unit for detecting the angle θ.

The angle memory 84 stores a specified angle that is specified as an angle that the lines are expected to have with respect to the main scanning direction when reading the line width measurement charts by using the image reading units 60a and 60b. The specified angle is the same for the image reading units 60a and 60b.

The angle comparison unit 85 compares the reading angle detected by the angle detection unit 83 with the specified angle stored in the angle memory 84, and determines whether or not the difference between these angles is equal to or smaller than a predetermined threshold. In the present exemplary embodiment, the specified angle is used as an example of a reference angle that is predetermined. The angle comparison unit 85 is provided as an example of a determination unit that determines whether or not the difference between the angle θ and the reference angle is equal to or smaller than the threshold.

If it is not determined by the angle comparison unit 85 that the difference between the angles is not equal to or smaller than the threshold, the alarm output unit 86 outputs an alarm indicating that it is necessary to reread the line width measurement chart. In the present exemplary embodiment, the alarm output unit 86 is provided as an example of an instruction unit that instructs rereading of a medium.

The pixel counting unit 87 counts the number of pixels in a part of a line to be measured in the line width measurement region determined by the region determining unit 82.

The line width determining unit 88 determines a value corresponding to the width of the line to be measured on the basis of the length in the line drawing direction of the line width measurement region determined by the region determining unit 82, the number of pixels counted by the pixel counting unit 87, and the like. In the present exemplary embodiment, the value corresponding to the line width is used as an example of line width information. The line width determining unit 88 is provided as an example of a generation unit that generates line width information and a line width information generation unit. The line width information is information regarding the line width of a line to be measured. In the present exemplary embodiment, the value corresponding to the line width is an example of the line width information. Alternatively, the line width information may be the line width itself or other information such as a symbol representing the line width.

Figure 10:
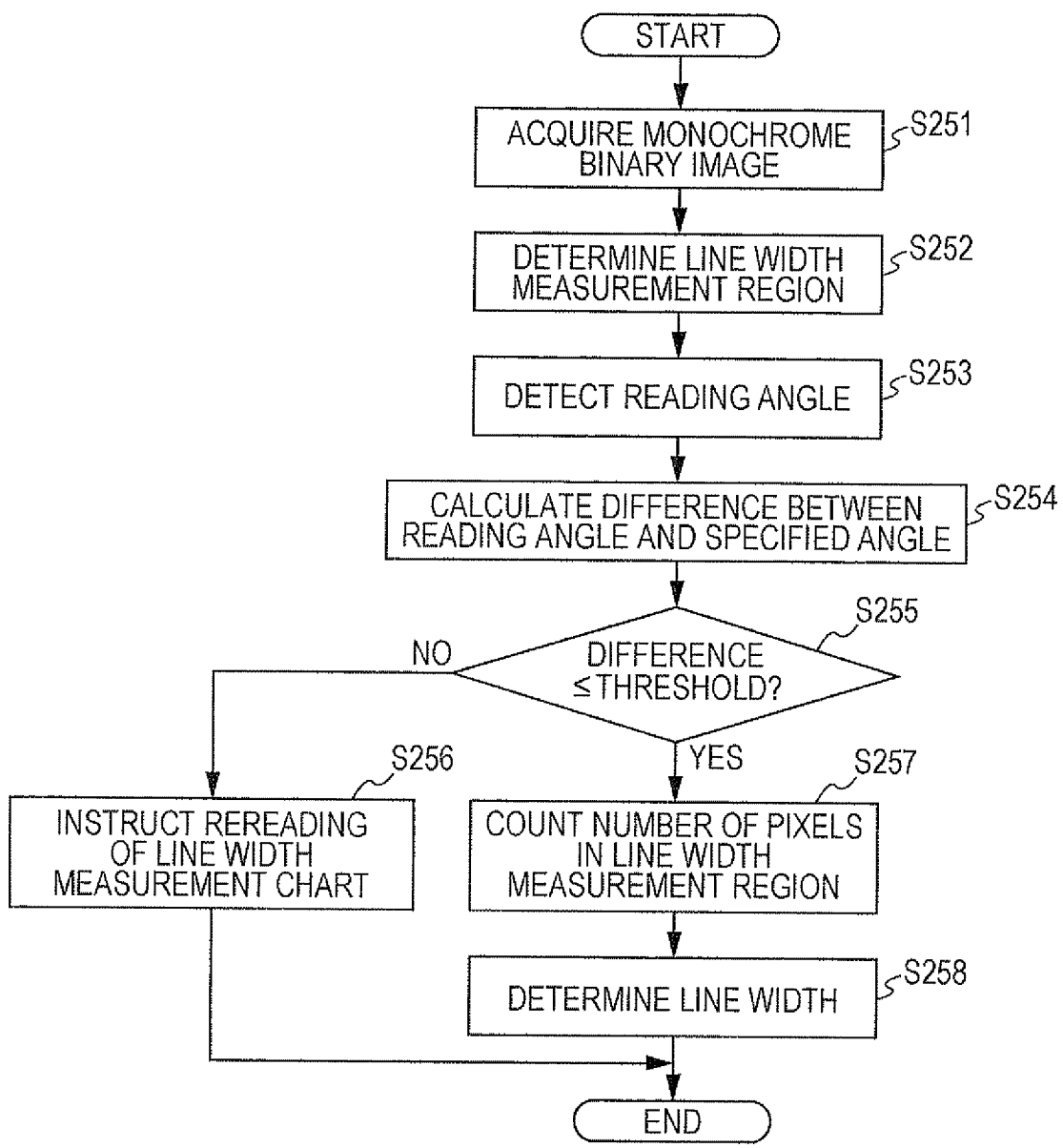
FIG. 10 is a flowchart illustrating an exemplary operation of a read image receiving unit of the image handling system according to the exemplary embodiment of the present invention.

FIG. 10 is a flowchart illustrating an exemplary operation of the read image receiving unit 25. The read image receiving unit 25 performs the operation illustrated in this flowchart irrespective of whether a read image of a line width measurement chart is sent from the image reading unit 60a or a read image of a line width measurement chart is sent from the image reading unit 60b. Therefore, it is assumed in the following description that the read image of the line width measurement chart is sent from the image reading unit 60. To simplify description, it is assumed here that the read image of the line width measurement chart includes a single line to be measured. It is assumed here that angle between the line and the main scanning direction is smaller than 45°, that the line drawing direction is the main scanning direction, and that the width direction is the sub-scanning direction.

As illustrated in FIG. 10, in the read image receiving unit 25, first, the monochrome binary image acquisition unit 81 acquires a monochrome binary image that the image reading unit 60 has obtained by reading the line width measurement chart (step 251).

Next, the region determining unit 82 determines a line width measurement region including a part of the line to be measured that is used for line width measurement and that is included in the monochrome binary image acquired in step 251 (step 252). For example, the line width measurement region may be determined by identifying an area in which the line to be measured is drawn by using a known image processing technique such as Hough transform, by adding margins having predetermined sizes above and below the area in the width direction, and by cutting the area to a length that is determined as described below in the line drawing direction.

The angle detection unit 83 detects the reading angle of the line to be measured included in the monochrome binary image (step 253). The reading angle may be detected, for example, by measuring the displacement between the intersection of the left side of the line width measurement region and the line to be measured and the right side of the line width measurement region and the line to be measured in the width direction, and by dividing the displacement by the length of the line width measurement region in the line drawing direction.

Then, the angle comparison unit 85 calculates the difference between the reading angle detected in step 253 and the specified angle stored in the angle memory 84 (step 254), and determines whether or not the difference is equal to or smaller than a predetermined threshold (step 255). This determination step is performed because it often happens that the actual reading angle does not become the same as the specified angle although a user wants the line width measurement chart to be read at the specified angle.

If it is determined that the difference between these angles is not equal to or smaller than the threshold, i.e., the difference is greater than the threshold, the alarm output unit 86 outputs alarm information that instructs the image reading unit 60 to reread the line width measurement chart (step 256).

If it is determined that the difference between these angles is equal to or smaller than the threshold, the pixel counting unit 87 counts the number of pixels in the line width measurement region determined in step 252 (step 257). Then the line width determining unit 88 determines the line width W by using an equation $W=(N_A/N_L)\times R$, where $N_A$ is the number of pixels counted in step 257, $N_L$ is the number of pixels corresponding to the length of the line width measurement region determined in step 252 in the line drawing direction, and R is the diameter of a pixel obtained by referring to predetermined information (step 258).

In this exemplary operation, it is assumed that the line width measurement chart includes a single line to be measured. If the line width measurement chart includes K lines to be measured, and the widths of the lines are $W_1, W_2, \ldots, W_K$ (points), the read image receiving unit 25 sends line widths $W1_i$ and line widths $W2_i$ (i=1, 2, ..., K) to the image quality characteristic comparison unit 26. Here, the line width $W1_i$ is obtained from a read image that is obtained by outputting a line having a width $W_i$ with the image forming section 50a and reading the line with the image reading unit 60a, and the line widths $W2_i$ is obtained from a read image that is obtained by reading a line having the width $W_i$ with the image forming section 50b and reading the line with the image reading unit 60b. Then, if the image quality characteristic comparison unit 26 determines that a line width $W1_A$ is equal to a line width $W2_B$, the image quality characteristic comparison unit 26 establishes a correspondence between the line width $W_A$ and the line width $W_B$.

In this exemplary operation, the line width is measured if a condition that the difference between the reading angle and the specified angle is equal to or smaller than the threshold is satisfied in step 255. Alternatively, the line width may be measured without determining whether such a condition is satisfied. In this case, in the line width measuring method illustrated in FIG. 4, it is necessary to consider the reading angle of each of the image reading units 60a and 60b. To be specific, the line width W (μm) is calculated by using an equation $W=(N_A/N_L)\times R\times\cos\theta$, where $N_A$ is the number of black pixels in the line width measurement region, $N_L$ is the number of black pixels corresponding to the length of the line width measurement region in the line drawing direction, R (μm) is the diameter of a pixel, and θ is the reading angle.

A method of determining the length of the line width measurement region in the line drawing direction used in step 252 of FIG. 10 will be described.

In the present exemplary embodiment, because the line width measurement chart is read in an orientation such that the line has a specified angle with respect to the main scanning direction and the read image is converted to a monochrome binary image, the monochrome binary image has pixel steps, and parts having different line widths are generated at a constant period.

Figure 11A:
FIGS. 11A and 11B illustrate a period of pixel steps that is taken into consideration when determining a part that is used to measure the width of a line to be measured.
Figure 11B:
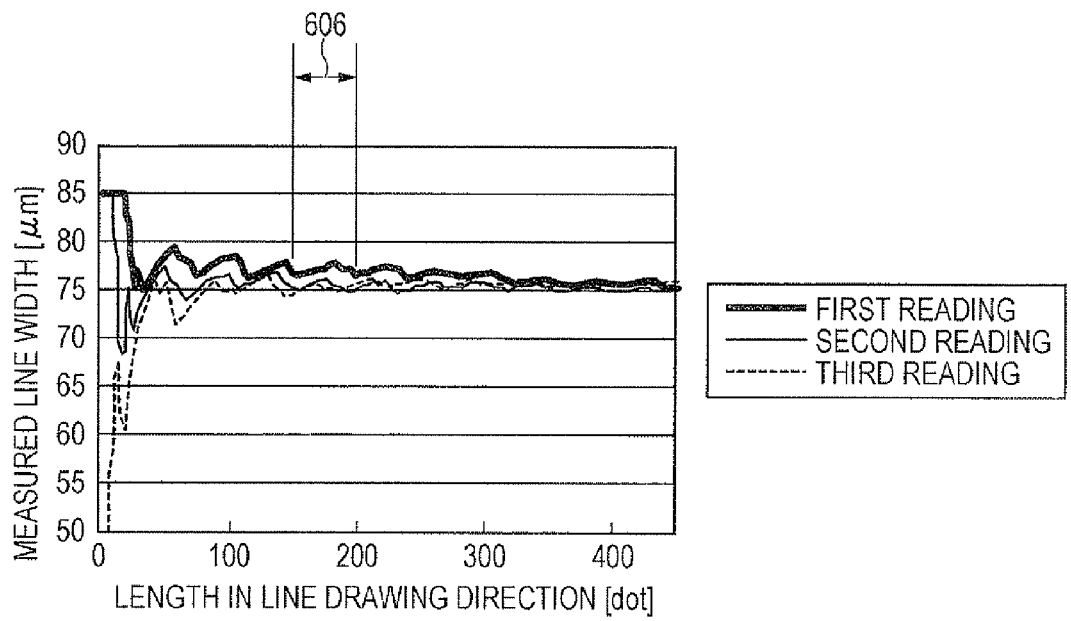

FIGS. 11A and 11B illustrate examples of such a period.

FIG. 11A illustrates a monochrome binary image of a line width measurement chart when the chart is read in an orientation such that the line has a specified angle with respect to the main scanning direction, in which the period is depicted. In this case, pixel steps are generated at a constant period as described above. The period is represented by a range 605 in FIG. 11A.

FIG. 11B illustrates a graph of width measurement results obtained when the line width measurement chart is read in an orientation such that the line has a specified angle with respect to the main scanning direction, in which the period is depicted. As illustrated in FIG. 11A, because the pixel steps are generated periodically in the monochrome binary image, parts having a larger width appear at a constant period in the graph. The period is represented by a range 606 in FIG. 11B.

Therefore, in step 252 of FIG. 10, the period may be measured and an integer multiple of (for example, 10 times) the period may be determined as the length of the line width measurement region in the line drawing direction. The period may be measured, for example, by obtaining plural lengths in the line drawing direction at which the measured line widths have relative maximum values in the graph of FIG. 11B, and by calculating the average of differences between adjacent pairs of such lengths in the line drawing direction.

When the integer multiple of the period of pixel steps is used as the length of the line width measurement region in the line drawing direction, it is necessary that the length of the line to be measured in the line drawing direction be larger than the length of the line width measurement region. To be specific, it is necessary that an inequality $L\times\cos\theta \geq T\times M$ hold where T is the period of pixel steps, M is the an integer that is multiplied to the period to calculate the length of the line width measurement region in the line drawing direction, L is the length of the line to be measured, and θ is the reading angle. Therefore, the image forming sections 50a and 50b may each print a line having a length L that satisfies an inequality $L \geq T\times M/\cos\theta$.

Instead of the method of using the period of pixel steps, a method of using a displacement amount of pixel steps, for example, may be used as a method of determining the length of the line width measurement region in the line drawing direction in step 252 of FIG. 10.

That is, as illustrated in FIG. 6B, when the length of the line width measurement region in the line drawing direction is sufficiently large, a large error may not be generated even if the length of the line width measurement region is not an integer multiple of the period of step of pixels. Therefore, the region determining unit 82 may determine the length of the line width measurement region in the line drawing direction at a length such that the displacement amount of pixel steps is limited within a predetermined range, i.e., such that the value of the measured line width converges and is limited within a predetermined range in FIG. 6B. In this case, the region determining unit 82 is an example of an extraction unit that extracts the displacement amount of steps of an image.

Here, image quality target information generated in step 208 of FIG. 3 will be described.

FIG. 12 illustrates an example of the image quality target information.

In FIG. 12, a section indicated by "Image/" includes description of a target regarding color and screen. A block indicated by "Color/" includes exemplary description of a target regarding color reproduction in general, in which "Intent=Perceptual" represents that gamut mapping is performed with emphasis on perception and "Gray=Normal" represents that a K-plane is generated with an ordinary method. The terms "RGB", "CMYK", etc, are each examples of description of a target regarding specific colors.

A section indicated by "Other/" includes description of a target regarding image processing policy. In a block indicated by "Policy/", "OOR=OFF" represents that rendering processing is not changed for each object, and "OOH=OFF" represents that screen processing is not changed for each object.

Although not shown in the figures, in the present exemplary embodiment, the image quality target information includes description of a target regarding line width. For example, if the width of a line output from the target apparatus 30a in accordance with print instruction data that instructs printing of a 3 pt line is equal to the width of a line output from the handling apparatus 30b in accordance with print instruction data that instructs printing of a 2 pt line, the description of target regarding line width is that 2 pt is to be changed to 3 pt when instructing the handling apparatus 30b to print a line.

In FIG. 12, the image quality target information is described in the form of a structured document. However, this is merely an example, and the form of the image quality target information is not limited thereto.

The image quality target information may be shared among plural image handling systems.

Next, an image handling operation of the image handling system will be described.

Figure 13:
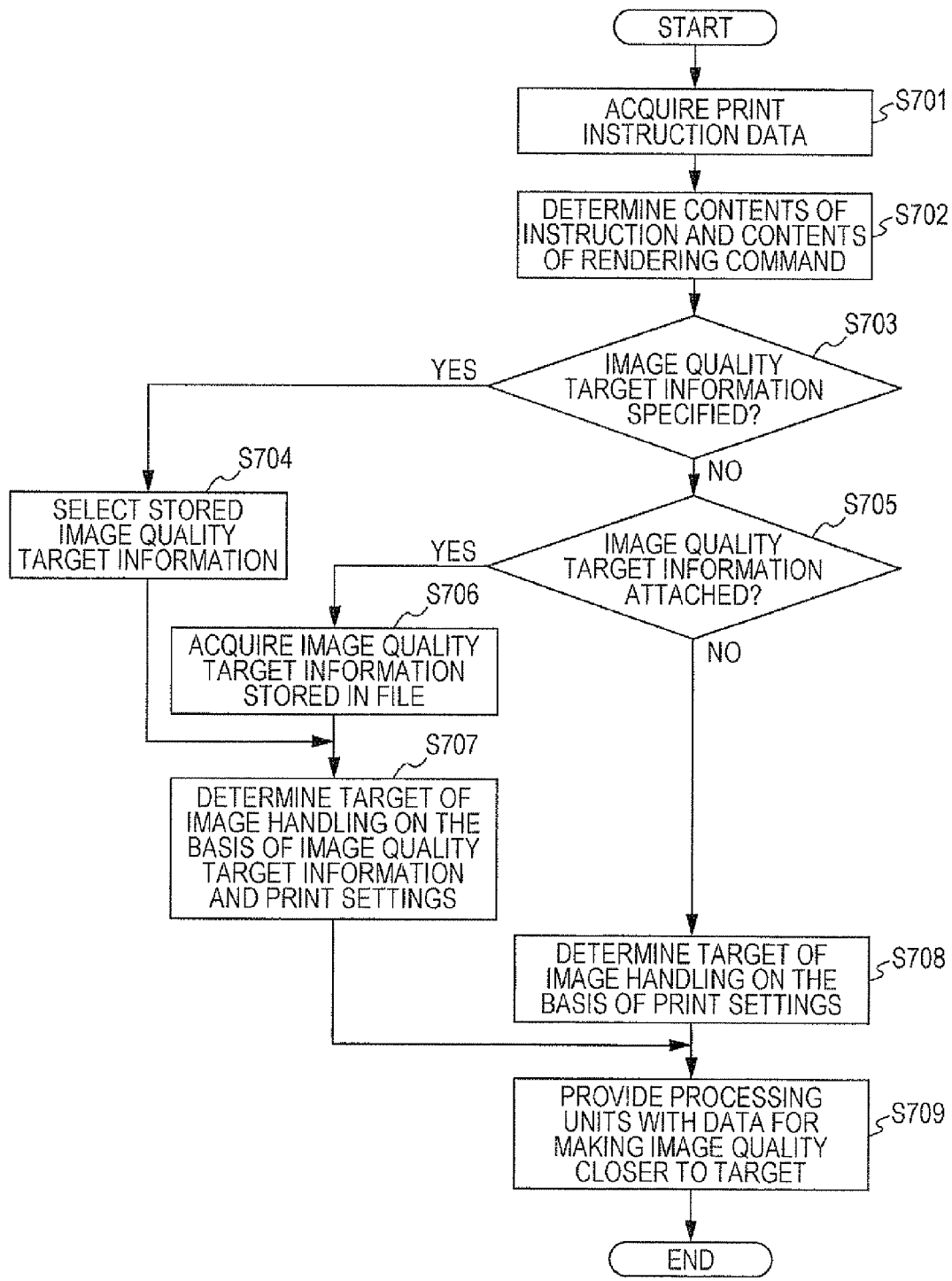
FIG. 13 is a flowchart illustrating an exemplary operation of an image handling unit of the image handling system according to the exemplary embodiment of the present invention.

FIG. 13 is a flowchart illustrating an exemplary operation of the image handling unit 70.

By using the application 18, a user specifies document data whose image quality characteristics are to be matched and the handling apparatus 30b that is used to output the document. Thus, the printer driver 19 generates print instruction data that instructs printing based on the document data, and transmits the print instruction data to the input information notification unit 41b. When the input information notification unit 41b receives the print instruction data, the operation of the image handling unit 70 is started. In this exemplary operation, the following three cases are assumed. In a first case, the image quality target information that has been stored in the handling apparatus 30b in step 209 of FIG. 3 is read and used. In a second case, the image quality target information stored in the terminal apparatus 10 in step 208 of FIG. 3 is attached and used. In a third case, the image quality target information is not used.

In the image handling unit 70, first, the instruction determination unit 71 and the rendering determination unit 72 acquire print instruction data that instructs printing based on specified document data from the input information notification unit 41b (step 701).

Then, the instruction determination unit 71 determines the contents of image quality instruction included in the print instruction data, the rendering determination unit 72 determines the contents of a rendering command included in the print instruction data, and the determination results are sent to the image handling target determining unit 73 (step 702). In the first case, the image quality instruction includes information that specifies image quality target information and print settings regarding image quality. In the second case, the image quality instruction includes a file that contains image quality target information and print settings regarding image quality. In the third case, the image quality instruction only includes print settings regarding image quality. In determining the contents of the image quality instruction, which of these cases the image quality instruction corresponds is also determined.

Next, the image handling target determining unit 73 determines whether or not the image quality instruction includes information that specifies image quality target information by using the determination result sent from the instruction determination unit 71 (step 703). If it is determined that the image quality instruction includes information that specifies image quality target information, the specified image quality target information is selected from the image quality target information that has been stored in the image quality target information memory 74 (step 704). Then, the target of image handling is determined on the basis of the image quality target information and the print settings (step 707).

If it is determined that the image quality instruction does not include information that specifies image quality target information, the image handling target determining unit 73 determines whether or not the image quality instruction includes a file containing the image quality target information on the basis of the determination result sent from the instruction determination unit 71 (step 705). If it is determined that the image quality instruction includes a file containing image quality target information, the image quality target information contained in the file is acquired as image quality target information that is temporarily applied only to the print instruction data (step 706). Then, the target of image handling is determined on the basis of the image quality target information and the print settings (step 707).

Moreover, in the case where the image quality instruction does not include a file containing image quality target information, the image handling target determining unit 73 determines the target of image handling only on the basis of print settings (step 708).

Subsequently, the image handling target determining unit 73 supplies the rendering processing unit 42b, the color reproduction processing unit 43b, and the halftone processing unit 44b with data for making the image quality characteristics of an image output by the handling apparatus 30b be closer to the target determined in step 707 or step 708 (step 709). In this case, if it is necessary to update the rendering command to make the image quality characteristics of an image output by the handling apparatus 30b be closer to the target, the rendering command whose contents have been determined by the rendering determination unit 72 is updated and supplied to the rendering processing unit 42b. When the image handling target determining unit 73 generates the data supplied to the processing units, the image handling parameters stored in the image handling parameter memory 75 are also used.

Here, the print instruction data acquired in step 701 of FIG. 13 will be described.

FIG. 14 illustrates examples of image quality instructions included in print instruction data.

An image quality instruction may be a file containing image quality target information as in the second case described above. Here, however, information that specifies image quality target information (specifying information) and print settings regarding the image quality in the printer driver 19 in the first case are illustrated. To be specific, image quality instructions with indices 1, 2, and 3 each include setting information regarding image quality factors such as resolution, gradation information, screen, color tone, etc. as print settings. Image quality instructions with indices 4 and 5 include terms such as "high image quality", "custom 1", etc., that are attached to the image quality target information as information that specifies image quality target information.

The image quality factors described here are merely examples. Other examples of the image quality factors include color reproduction with respect to an input color signal (for example, a CMYK or RGB signal), thin line reproduction with respect to an input line width specification (for example, mm or pixel), image processing policy for each object (OOR/OOH), screen angle, and a method for rendering each object (raster or vector).

FIG. 15 illustrates examples of rendering commands included in print instruction data.

FIG. 15 illustrates rendering commands and actual rendering operations corresponding to the rendering commands. For example, different rendering operations may be performed on the same document data as in the cases of "character rendering 1" and "character rendering 2". In such a case, it may be difficult to match the image quality characteristics of the handling apparatus 30*b* to the image quality characteristics of the target apparatus 30*a*. Therefore, the contents of rendering operation performed by the target apparatus 30*a* are estimated on the basis of an output result, and the estimated result is fed back to the handling apparatus 30*b*, whereby the output results are made closer to each other.

Next, the hardware structure of the terminal apparatus 10 will be described.

Figure 16:
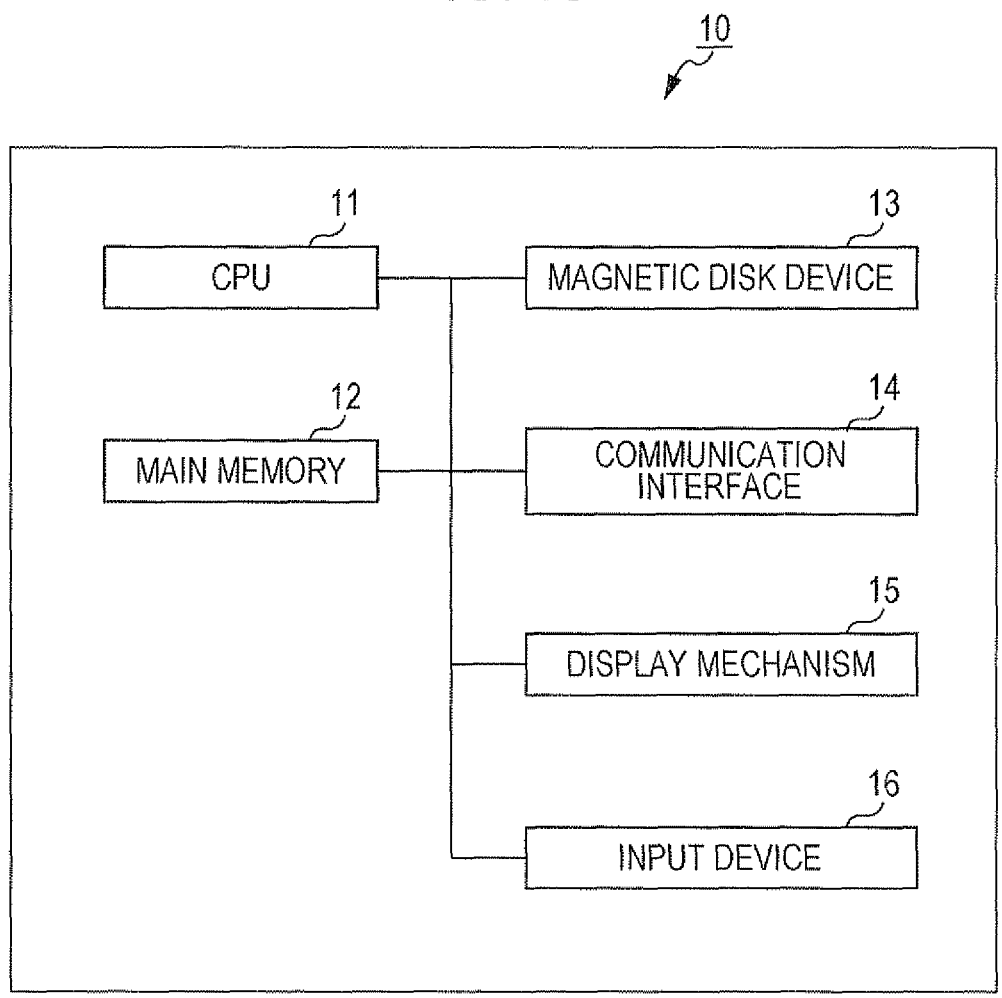
FIG. 16 is a hardware block diagram of a terminal apparatus of the image handling system according to the exemplary embodiment of the present invention.

FIG. 16 is a hardware block diagram of the terminal apparatus 10.

As illustrated in FIG. 16, the terminal apparatus 10 includes a central processing unit (CPU) 11, a main memory 12, and a magnetic disk device (HDD: hard disk drive) 13. The CPU 11 executes software programs such as an operating system (OS) and applications, and thereby performs various functions described above. The main memory 12 is a storage area for storing the software programs, data, and the like that are used to execute the software programs. The magnetic disk device 13 is a storage area for storing data that is input to the software programs and data that is output from the software programs.

The terminal apparatus 10 further includes a communication interface 14 that is used to perform communication with external apparatuses; a display mechanism 15 including a video memory, a display, etc.; and an input device 16 including a keyboard, a mouse, etc.

Lastly, the mechanism of the image processing apparatus 30, which functions as the target apparatus 30*a* and the handling apparatus 30*b*, will be described.

Figure 17:
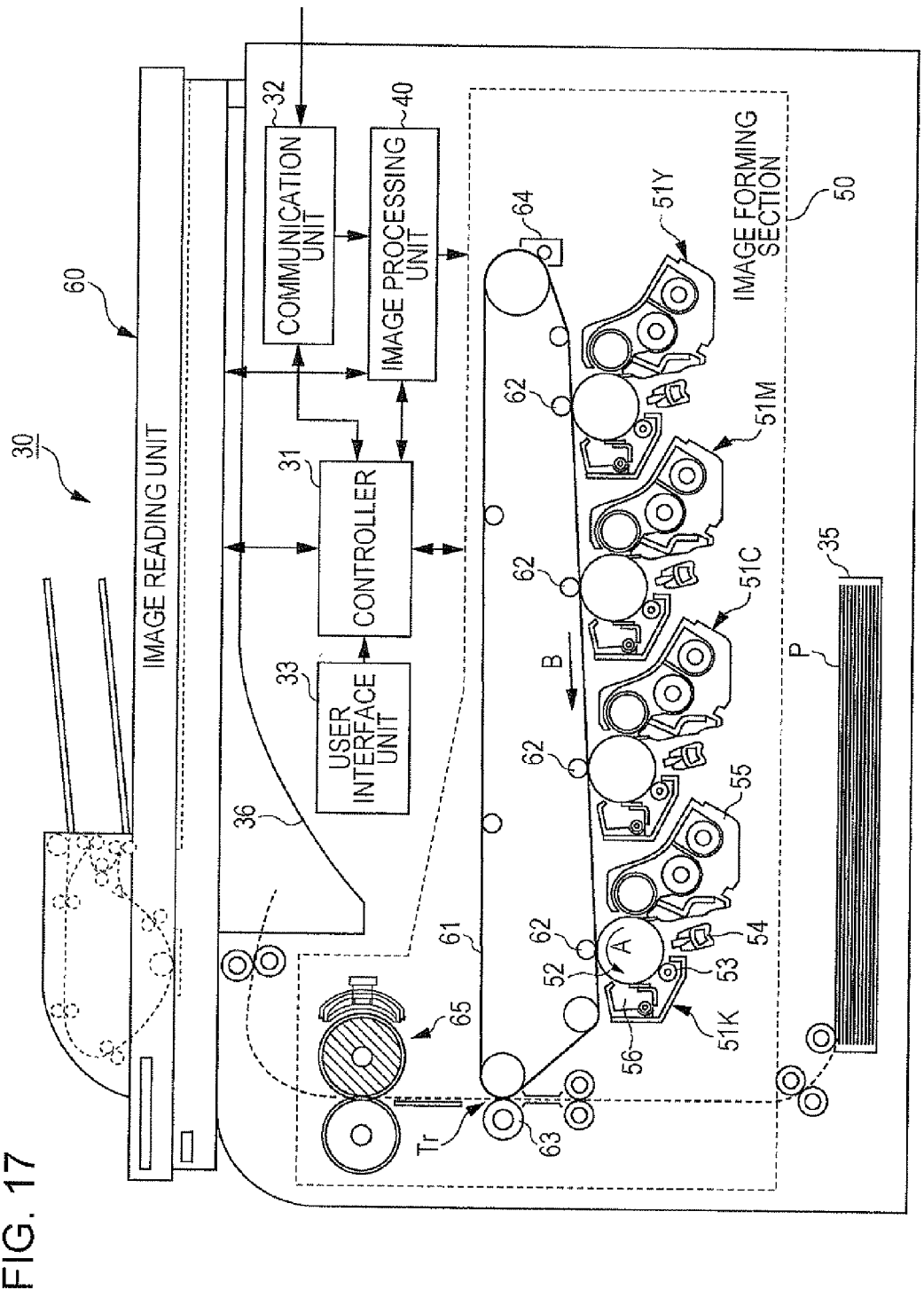
FIG. 17 illustrates an exemplary structure of an image processing apparatus of the image handling system according to the exemplary embodiment of the present invention.

FIG. 17 illustrates an exemplary structure of the image processing apparatus 30. The image processing apparatus 30, which is a so-called tandem-type color printer, includes an image forming section 50 that forms an image on the basis of image data and a controller 31 that controls the overall operation of the image processing apparatus 30. The image processing apparatus 30 further includes a communication unit 32, an image reading unit 60, an image processing unit 40, and a user interface (UI) unit 33. The communication unit 32 performs communication with a PC or the like and receives print instruction data. The image reading unit 60 reads an image of a document and generates a read image. The image processing unit 40 acquires image data by performing a predetermined image processing operation on print instruction data received by the communication unit 32 and on the read image generated by the image reading unit 60, and transfers the image data to the image forming section 50. The user interface (UI) unit 33 receives operational inputs from a user and displays various information items for a user.

The image forming section 50 generates an image by using, for example, an electrophotographic method. The image forming section 50 includes four image forming units 51Y, 51M, 51C, and 51K (hereinafter referred to as "image forming units 51") that are arranged parallel to one another. Each of the image forming units 51 includes, as functional members, a photoconductor drum 52, a charger 53, an exposure unit 54, a developing unit 55, and a drum cleaner 56. While the photoconductor drum 52 rotates in the direction of arrow A, an electrostatic latent image is formed on the photoconductor drum 52, and subsequently a toner image is formed on the photoconductor drum 52. The charger 53 charges the surface of the photoconductor drum 52 to a predetermined potential. The exposure unit 54 exposes the photoconductor drum 52, which has been charged by the charger 53, to light on the basis of image data. The developing unit 55 develops the electrostatic latent image formed on the photoconductor drum 52 by using toners of different colors. The drum cleaner 56 cleans the surface of the photoconductor drum 52 after transfer has been finished.

The image forming units 51 have the same structure except for the colors of toners contained in the developing units 55, and form yellow (Y), magenta (M), cyan (C), and black (K) toner images.

The image forming section 50 includes an intermediate transfer belt 61 and first transfer rollers 62. Color toner images formed on the photoconductor drums 52 of the image forming units 51 are multi-transferred to the intermediate transfer belt 61. The first transfer rollers 62 successively transfer (first-transfer) the color toner images formed by the image forming units 51 to the intermediate transfer belt 61. The image forming section 50 further includes a second transfer roller 63 and a fixing unit 65. The second transfer roller 63 simultaneously transfers (second-transfers) the color toner images, which have been multi-transferred to the intermediate transfer belt 61, to a sheet P, which is a recording medium (recording sheet). The fixing unit 65 fixes the color toner images, which have been second-transferred, to the sheet P.

The image forming units 51 of the image forming section 50 form yellow (Y), magenta (M), cyan (C), and black (K) toner images by an electrophotographic process using the functional members described above. The color toner images formed by the image forming units 51 are successively and electrostatically transferred to the intermediate transfer belt 61 by the first transfer rollers 62, and a composite toner image composed of toners of different colors is formed. As the intermediate transfer belt 61 moves (in the direction of arrow B), the composite toner image on the intermediate transfer belt 61 is transported to a second transfer region Tr in which the second transfer roller 63 is disposed, and are simultaneously and electrostatically transferred to the sheet P supplied from a sheet container 35. Subsequently, the fixing unit 65 fixes the composite toner image, which has been electrostatically transferred to the sheet 2, to the sheet P. The sheet P, to which the image has been fixed, is transported to a sheet tray 36 disposed in an output section of the image processing apparatus 30 and is stacked on the sheet tray 36.

The drum cleaner 56 and a belt cleaner 64 remove toner (first-transfer residual toner) that remains on the photoconductor drum 52 after the first transfer has been finished and toner (second transfer residual toner) that remains on the intermediate transfer belt 61 after the second transfer has been finished.

In this way, the image processing apparatus 30 repeatedly performs image forming operations for the number of sheets to be printed.

The image forming section 50 and the image reading unit 60 of the image processing apparatus 30 may be calibrated so that the characteristics thereof are made closer to reference characteristics.

The image processing apparatus 30 may perform pre-processing in accordance with image quality factors extracted by the image quality factor extraction unit 21. Examples of such pre-processing include gradation correction performed by the image processing unit 40, registration correction performed by the image forming section 50, and running of plural sheets.

Moreover, in the image reading unit 60, the reading precision and the reading position or the like of the image reading unit 60a may changed in accordance with the image quality factors extracted by the image quality factor extraction unit 21.

In the present exemplary embodiment, line width measurement is performed by the image handling utility 20 of the terminal apparatus 10. However, this is not limited thereto. Alternatively, for example, line width measurement may be performed by the image reading unit 60a of the target apparatus 30a and by the image reading unit 60b of the handling apparatus 30b. Further alternatively, line width measurement may be performed by an independent device through which the target apparatus 30a and the handling apparatus 30b transmit read images to the terminal apparatus 10.

A program implementing the present exemplary embodiment may be provided through a communication unit or may be provided through a recording medium such as a CD-ROM that stores the program.

The foregoing description of the exemplary embodiments of the present invention has been provided for the purposes of illustration and description. It is not intended to be exhaustive or to limit the present invention to the precise forms disclosed. Obviously, many modifications and variations will be apparent to practitioners skilled in the art. The exemplary embodiments were chosen and described in order to best explain the principles of the present invention and its practical applications, thereby enabling others skilled in the art to understand the present invention for various embodiments and with the various modifications as are suited to the particular use contemplated. It is intended that the scope of the present invention be defined by the following claims and their equivalents.

What is claimed is:

1. A line width measuring device comprising:
an acquisition unit that acquires a binary image that is obtained by reading a medium having a line width sample printed thereon with an image reading device, the line width sample representing output characteristics regarding a line width of an image forming device;
an extraction unit that extracts a displacement amount of steps that are repeatedly generated in an image corresponding to the line width sample in the binary image by reading the medium with the image reading device in an orientation such that the line width sample has an angle $\theta$ ($0°<\theta<90°$) with respect to a main scanning direction of image reading;
a generation unit that generates line width information regarding a width of the line width sample by using the displacement amount extracted by the extraction unit;
a detection unit that detects the angle $\theta$ on the basis of the binary image acquired by the acquisition unit;
a determination unit determines whether or not a difference between the angle $\theta$ detected by the detection unit and a reference angle is equal to or smaller than a predetermined threshold, the reference angle being predetermined as an angle that the line width sample is expected to have with respect to the main scanning direction; and
an instruction unit that instructs the image reading device to reread the medium if it is determined that the difference is not equal to or smaller than the threshold by the determination unit, wherein
the extraction unit additionally extracts a period of steps that are repeatedly generated in an image corresponding to the line width sample in the binary image by reading the medium with the image reading device in an orientation such that the line width sample has an angle $\theta$ ($0°<\theta<90°$) with respect to a main scanning direction of image reading; and
the generation unit generates line width information regarding a width of the line width sample by using the period extracted by the extraction unit.

2. The line width measuring device according to claim 1, wherein the generation unit generates the line width information on the basis of the angle $\theta$ detected by the detection unit.

3. The line width measuring device according to claim 1, wherein the generation unit generates the line width information by using a part of the image corresponding to the line width sample in the binary image, the part having a length that is an integer multiple of the period extracted by the extraction unit.

4. A line width measuring method comprising:
acquiring a binary image that is obtained by reading a medium having a line width sample printed thereon with an image reading device, the line width sample representing output characteristics regarding a line width of an image forming device;
extracting a displacement amount of steps that are repeatedly generated in an image corresponding to the line width sample in the binary image by reading the medium with the image reading device in an orientation such that the line width sample has an angle $\theta$ ($0°<\theta<90°$) with respect to a main scanning direction of image reading;
generating line width information regarding a width of the line width sample by using the extracted displacement amount;
detecting the angle $\theta$ on the basis of the binary image acquired;
determining whether or not a difference between the angle $\theta$ detected and a reference angle is equal to or smaller than a predetermined threshold, the reference angle being predetermined as an angle that the line width sample is expected to have with respect to the main scanning direction; and
instructing the image reading device to reread the medium if it is determined that the difference is not equal to or smaller than the threshold, wherein
extracting a period of steps that are repeatedly generated in an image corresponding to the line width sample in the binary image by reading the medium with the image reading device in an orientation such that the line width sample has an angle $\theta$ (0°<$\theta$<90°) with respect to a main scanning direction of image reading; and generating line width information regarding a width of the line width sample by using the period extracted.

5. An image processing apparatus comprising:
a printing unit that prints a line width sample representing output characteristics regarding a line width thereof;
a reading unit that reads a medium on which the line width sample is printed by the printing unit;
an acquisition unit that acquires a binary image that is obtained by reading the medium with the reading unit; and
the line width measuring device of claim 1.

6. The image processing apparatus according to claim 5, wherein the printing unit prints a folding line corresponding to a reference angle on the medium in addition to the line width sample so that the medium is read in an orientation having a reference angle with respect to the main scanning direction, the reference angle being predetermined as an angle that the line width sample is expected to have with respect to the main scanning direction.

7. The image processing apparatus according to claim 5, wherein the reading unit further includes a restraining member that restrains an orientation of the medium so that the line width sample is read in an orientation having a reference angle with respect to the main scanning direction, the reference angle being predetermined as an angle that the line width sample is expected to have with respect to the main scanning direction.

8. The image processing apparatus according to claim 5, wherein the printing unit further prints information on the medium, the information representing at least one of the main scanning direction and a sub-scanning direction for printing the line width sample.

9. The image processing apparatus according to claim 5, wherein the printing unit prints the line width sample having a length on the medium, the length being equal to or larger than a predetermined multiple of the period extracted by the extraction unit.

10. An image processing system comprising:
an information transmitting device that transmits print instruction information that instructs printing of a line width sample representing output characteristics regarding a line width of a printer;
a first printer that prints a first line width sample on a first medium on the basis of the print instruction information transmitted by the information transmitting device;
a first reading device that reads the first medium on which the first line width sample is printed by the first printer;
a second printer that prints a second line width sample on a second medium on the basis of the print instruction information transmitted by the information transmitting device;
a second reading device that reads the second medium on which the second line width sample is printed by the second printer; and
an information generating device that generates correction information that makes output characteristics regarding a line width of the first printer and output characteristics regarding a line width of the second printer be closer to each other,
wherein the information generating device includes
an acquisition unit that acquires a first binary image obtained by reading the first medium with the first reading device and that acquires a second binary image obtained by reading the second medium with the second reading device,
an extraction unit that extracts a first displacement amount and a second displacement amount, the first displacement amount being a displacement amount of steps that are repeatedly generated in an image corresponding to the first line width sample in the first binary image by reading the first medium with the first reading device in an orientation such that the first line width sample has an angle $\theta 1$ (0°<$\theta 1$<90°) with respect to a main scanning direction of image reading, the second displacement amount being a displacement amount of steps that are repeatedly generated in an image corresponding to the second line width sample in the second binary image by reading the second medium with the second reading device in an orientation such that the second line width sample has an angle $\theta 2$ (0°<$\theta 2$<90°) with respect to the main scanning direction of image reading,
a line width information generation unit that generates first line width information regarding a width of the first line width sample by using the first displacement amount extracted by the extraction unit and that generates second line width information regarding a width of the second line width sample by using the second displacement amount extracted by the extraction unit, and
a correction information generation unit that generates the correction information on the basis of the first line width information and the second line width information generated by the line width information generation unit.

11. A non-transitory computer readable medium storing a program causing a computer to execute a process for measuring a line width, the process comprising:
acquiring a binary image that is obtained by reading a medium having a line width sample printed thereon with an image reading device, the line width sample representing output characteristics regarding a line width of an image forming device;
extracting a displacement amount of steps that are repeatedly generated in an image corresponding to the line width sample in the binary image by reading the medium with the image reading device in an orientation such that the line width sample has an angle $\theta$ (0°<$\theta$<90°) with respect to a main scanning direction of image reading;
generating line width information regarding a width of the line width sample by using the displacement amount;
detecting the angle $\theta$ on the basis of the binary image acquired;
determining whether or not a difference between the angle $\theta$ detected and a reference angle is equal to or smaller than a predetermined threshold, the reference angle being predetermined as an angle that the line width sample is expected to have with respect to the main scanning direction; and
instructing the image reading device to reread the medium if it is determined that the difference is not equal to or smaller than the threshold, wherein
extracting a period of steps that are repeatedly generated in an image corresponding to the line width sample in the binary image by reading the medium with the image reading device in an orientation such that the line width sample has an angle $\theta$ (0°<$\theta$<90°) with respect to a main scanning direction of image reading; and generating line width information regarding a width of the line width sample by using the period extracted.

* * * * *